United States Patent
Zur et al.

(12) 
(10) Patent No.: US 8,180,846 B1
(45) Date of Patent: May 15, 2012

(54) METHOD AND APPARATUS FOR OBTAINING AGENT STATUS IN A NETWORK MANAGEMENT APPLICATION

(75) Inventors: Mordechai Zvi Zur, Newton, MA (US);
Benjamin Thrift, Reston, VA (US);
Ohad Zeliger, Westborough, MA (US);
Boris Farizon, Westborough, MA (US)

(73) Assignee: EMC Corporation, Hopkinton, MA (US)

( * ) Notice: Subject to any disclaimer, the term of this patent is extended or adjusted under 35 U.S.C. 154(b) by 920 days.

(21) Appl. No.: 11/170,027

(22) Filed: Jun. 29, 2005

(51) Int. Cl.
*G06F 15/16* (2006.01)
*G06F 9/46* (2006.01)

(52) U.S. Cl. ........................ 709/217; 718/100
(58) Field of Classification Search .................. 709/217, 709/218, 219, 202; 718/100
See application file for complete search history.

(56) References Cited

U.S. PATENT DOCUMENTS

| | | | |
|---|---|---|---|
| 5,655,081 A * | 8/1997 | Bonnell et al. | 709/202 |
| 5,768,587 A * | 6/1998 | Freund et al. | 718/101 |
| 5,805,884 A * | 9/1998 | Sitbon et al. | 719/320 |
| 7,003,527 B1 * | 2/2006 | Lavallee et al. | 1/1 |
| 7,343,301 B1 * | 3/2008 | Nash et al. | 705/1.1 |
| 7,403,542 B1 * | 7/2008 | Thompson | 370/474 |
| 7,711,805 B1 * | 5/2010 | Dale | 709/223 |
| 2003/0145041 A1 * | 7/2003 | Dunham et al. | 709/203 |
| 2003/0236811 A1 * | 12/2003 | Green et al. | 709/100 |
| 2005/0188221 A1 * | 8/2005 | Motsinger et al. | 713/201 |
| 2006/0095903 A1 * | 5/2006 | Cheam et al. | 717/168 |

* cited by examiner

*Primary Examiner* — Phuoc Nguyen
*Assistant Examiner* — Steven Nguyen
(74) *Attorney, Agent, or Firm* — Krishnendu Gupta; Gerald P. Kazanjian

(57) ABSTRACT

A system determines status of agent execution of a command in a network. The system identifies a command to be performed by an agent and issues the command to the agent for execution. The agent operates a status manager that tracks execution status of commands in the agent. The system sends status requests to the agent to determine a status of execution of the command by the agent and the agent responds and sends a status response indicating the status of the execution of the command by the agent. Applications are thus provided with current status of execution of long running commands in an agent.

23 Claims, 8 Drawing Sheets

METHOD AND APPARATUS FOR OBTAINING AGENT STATUS IN A NETWORK MANAGEMENT APPLICATION

BACKGROUND

The rapid expansion of information service and data processing industries has resulted in a need for computer systems to manage and store large amounts of data. As an example, financial service industry organizations such as banks, mutual fund companies or the like often operate large and complex data processing systems that require access to many hundreds of gigabytes or even terabytes of data. Computer system developers have responded to these types of data storage and information sharing requirements by crating large complex networks that store data. An example of a network that stores data is referred to as a storage area network or SAN. A typical SAN is a collection of data storage systems that are networked with a number of host computer systems that operate as servers to access data stored in the data storage systems. Other types of networks include wide are networks such as the Internet and local area network such as smaller corporate networks.

Using a SAN as an example network, elements of a typical conventional storage area network implementation include one or more connectivity devices such as high speed data switches or routers that interconnect the various data storage systems to each other and to one or more host or server computer systems (servers) that require access to (e.g., read and/or write) the data in the data storage systems on behalf of client software applications and/or client computer systems.

A developer or manager of such a network environment may install one or more distributed network management software applications within host computers in the network to manage or administer the various resources (i.e., devices, host computer systems, storage systems, applications, etc.) that operate within the network. A network manager (i.e., a person) responsible for management of the network operates the network management software application(s) to perform management tasks such as performance monitoring, network analysis and remote configuration and administration of the various components (i.e., software and hardware resources) operating within the network.

A conventional network management software application may have several different software components that execute independently of each other on different computer systems but that collectively interoperate together to perform network management. As an example, conventional designs of storage area network management software applications can include a management station programs such as console and server processes, several agent processes that operate on remote host computers, store process and possibly other software processes.

Generally, the server process operates as a central control process within the storage area network management application and coordinates communication between the console, storage and agent processes. The console process often executes within a dedicated network management workstation to allow a network administrator to visualize and remotely control and manage the various elements within the storage area network that are graphically represented on an interface presented by the console. The console allows the administrator to, for example, issue a command to an agent operating on a host computer within the network being managed. Agent processes execute on various host computer systems such as servers within the storage area network to manage storage area network entities (i.e., managed resources such as devices). As an example, there may be different respective agent programs specifically designed (e.g., coded) to remotely manage and control certain vendor-specific data storage systems, databases, switches, and so forth.

Agent processes receive remote management commands from the server process and apply functionality associated with those management commands to the managed resources within the storage area network for which those agents are designated to manage. Agents may receive a command, for example, to collect or discover configuration or management data concerning the network resources that those agents manage. This device discovery data collection process can happen in a scheduled or periodic manner, or in response to a command received from the management server. When agents are finished processing a command, results are returned to the store process for storage within a database. The server can then access the database to view the results of the command sent to the agent process.

SUMMARY

Conventional network management applications that utilize agents that receive commands from server or other processes suffer from a variety of deficiencies. In particular, when a command is provided from a server or other process to an agent process, conventional systems do not provide mechanisms to allow that agent to track specific status of operation (e.g. execution) of the command within the agent. Additionally, conventional network management applications that provide for remote agent command execution provide no specific mechanisms to allow the server to console processes to obtain detailed status on the progress of execution of the command by that agent (or lack of performance in the event of a failure of the command or if the agent is slow to execute). As a result, a user such as a storage area network manager who initiates execution of a command that is then sent to an agent is not made aware of the state of execution of that command by the agent until the command completes execution and the conventional agent returns the data produced as a result of command execution into the database. Some commands may cause and agent to perform execution of that command for long periods of time, such as several minutes or even hours. In such cases, using a conventional management application, the operator is left guessing about the progress of execution of the command by the agent until completion of the command (if it completes successfully) since there are no status reporting mechanism provided to provide periodic detailed status of command execution by an agent.

As an example, if an agent is responsible for controlling operation of (i.e., managing) a large capacity data storage system (such as an array of disks), the operator may desire to obtain the current state of the storage system by sending a command to the agent to capture or discover the current state of all managed resources associated with (i.e., operating within) that storage system. The actual data collection process that the agent performs uses software application programming interfaces to query the data storage system for data indicating the current configuration and operational state of the data storage system. The data storage system responds by sending the agent numerous portions of management data that contain a snapshot of the state of configuration of the data storage system. The conventional agent then transports the entire management data set to the storage component of the management application. This data transfer operation may be done in portions over time to limit load placed on the storage process. The storage component of the network management application receives the collected management data from the agent and processes and stores this information into a storage area network management database for access by the server and console components. The agent completes execution of the command when all data has been collected form the management resource and successfully transferred to the store process for placement in the database. The full execution of the command by the agent from start to finish may take several minutes or hours to complete.

Embodiments of the invention provide a system including methods, computer apparatus, and computer readable medium encoded with software that are capable of determining status of agent execution of a command in a network by an agent. The system includes a command manager process that operates in a server computer such as a network management station and the system also includes a status manager process that operates within an agent receiving a command from the command manager process in the server. The processing of the command manager and the status manager each alone, or in combination, represents embodiments of the invention.

During operation of the command manager within the server, the command manager identifies a command to be performed by an agent, such as a command received by the command manager from an application such as the console. In one configuration, receipt of the command includes receiving a command submission indicating the command is to be executed as a transaction on the agent and indicating that the application is to be notified of the status of the command. The command manager creates a transaction identifier associated with the command and registers the application as an application to be notified of the execution status of the command by the agent in association with the transaction identifier. The command manager then issues the command to the agent for execution by the agent. In one configuration, issuance of the command includes transmitting the command and associated transaction identifier to the agent to allow the agent to execute the command and track status of the progress of execution of the command in association with the transaction identifier associated with the command.

The application can provide the command manager with an interval at which to check status of execution of the command by the agent. Upon occurrence of this interval, the command manager sends a status request to the agent to determine a status of execution of the command by the agent. In one configuration, the status request includes the associated transaction identifier to allow the agent to associate the status request with specific execution status of the command in progress by the agent based on the transaction identifier. In response to the status request, the command manager receives a status response from the agent indicating the status of the execution of the command by the agent. In one configuration, the status response identifies a transaction identifier associated with the status response and the command manager can identify the application(s) to be notified of the execution status of the command by the agent in association with the transaction identifier and returns status indicated within the status response to the application(s) having the associated transaction identifier that have registered to receive status on execution of the command.

In one configuration, the command is a long running command to be executed by the agent for more than one minute and sending of status requests to the agent to determine a status of execution of the command by the agent occurs multiple times during execution of the command by the agent. The status of the execution of the command by the agent can include, for example, returning, to the application, status such as command completed, command in progress, command failed or command unknown status.

In an agent operating to manage a resource in a storage area network, the system provides a status manager that provides status of a command executed by the agent. The status manager operates to receiving a command to be executed by the agent (i.e. the command described above sent form the command manager). The status manager registers the command within the agent and maintains current execution state of the command by the agent. During receipt of the command, the status manager in one configuration receives a transaction identifier associated with the command to be performed by the agent and allocates a status entry in a status table based on the transaction identifier. The status table containing the status entry (and other entries for other commands for that agent) stores current execution state of the command(s) that are operational within the agent in association with the transaction identifier for that command.

The agent executes the command to perform a management function specified by the command in association with a resource in the storage area network. While the command is within the agent (either awaiting performance, or in progress, completed, failed, etc.), the status manager maintains current execution state of the command in during execution of the command within the agent. Example execution status can include completed, in progress, failed, unknown. The execution state is not limited to a state of the command while the agent is actually performing the command, since some commands may be received by an agent and may be queued for performance at a later time if the agent is busy performing other commands. Thus by execution state, what is meant herein is the state of any command that has been received by the agent for performance and is still maintained in the agent in some status such as waiting, queued, in progress, halted, stalled, etc. These are other examples of execution state. During operation/execution of the command in the agent, the status manager obtains execution state of the command within the agent and stores the execution state of the command within the status entry in the status table maintained within the agent.

The status manager in the agent receives at least one status request requesting status of execution of the command by the agent and returns a respective status response in response to each status request. Each status response indicates the current execution status of the command by the agent. Each status request includes a transaction identifier associated with a command that has been sent to that agent. Based on the transaction identifier, the status manager obtains execution state of a specific status entry in the status table associated with that transaction identifier. The specific status entry indicates the specific execution status of a command in the agent that was formerly received with the associated transaction identifier. In this manner, the system allows agents to be queried to indicate status of commands that have been sent to that agent. The application requiring such status can specify the query interval and the command manager will handle initiating the query to the agent and returning the reported status back to the application.

Other embodiments of the invention include computerized devices, such as host and management server computer systems, workstations or other computerized devices configured to process all of the method operations disclosed herein as embodiments of the invention for both the agent and store processes. In such embodiments, a computerized device includes a memory system, a processor, a communications interface and an interconnection mechanism connecting these components. The memory system is encoded with either an agent application (if the host computer) or a server application (if the storage computer system) that when performed on the processor, produces an agent process including a status manager (or server process including a command manager) that operate as explained herein within the respective host or management server computerized devices to perform all of the method embodiments and operations explained herein as embodiments of the invention alone of in combination with each other.

Other arrangements of embodiments of the invention that are disclosed herein include software programs to perform the method embodiment steps and operations summarized above and disclosed in detail below for both the agent and/or the store process. More particularly, a computer program product is disclosed that has a computer-readable medium including computer program logic encoded thereon that when performed in a computerized device provides associated operations of the command manager, or the status manager process, each as respectively explained herein. The computer program logic, when executed on at least one processor with a computing system, causes the processor to perform the operations (e.g., the methods) indicated herein as embodiments of the invention. Such arrangements of the invention are typically provided as software, code and/or other data structures arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC) or as downloadable software images in one or more modules, shared libraries, etc. The software or firmware or other such configurations can be installed onto a computerized device to cause one or more processors in the computerized device to perform the techniques explained herein as embodiments of the invention. Software processes that operate in a collection of computerized devices, such as in a group of storage area network management servers, hosts or other entities can also provide the system of the invention. The system of the invention can be distributed between many software processes on several computers, or all processes such as the agent and store process could execute on a small set of dedicated computers, or on one computer alone. Though preferred embodiments provide the agent and server process execute on separate computer systems, the particular distribution of the agent and management server process is not intended to be limiting.

It is to be understood that the system of the invention can be embodied strictly as a software program, as software and hardware, or as hardware alone. Example embodiments of the invention may be implemented within EMC's Control Center software application that provides management functionality for storage area network resources and in computerized devices that operate the Control Center software. Control Center is manufactured by EMC Corporation of Hopkinton, Mass., USA.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, with emphasis instead being placed upon illustrating the embodiments, principles and concepts of the invention.

DETAILED DESCRIPTION

Embodiments of the invention provide a mechanisms and techniques including methods, computer apparatus, and computer readable medium encoded with software and a system that are capable of determining status of agent execution of a command in a network by an agent and that can report this status to one or more applications. The system includes a command manager process that operates in a server computer such as a network management station and the system also includes a status manager process that operates within an agent receiving a command from the command manager process in the server. The processing of the command manager and the status manager each alone, or in combination, represents embodiments of the invention.

Figure 1:
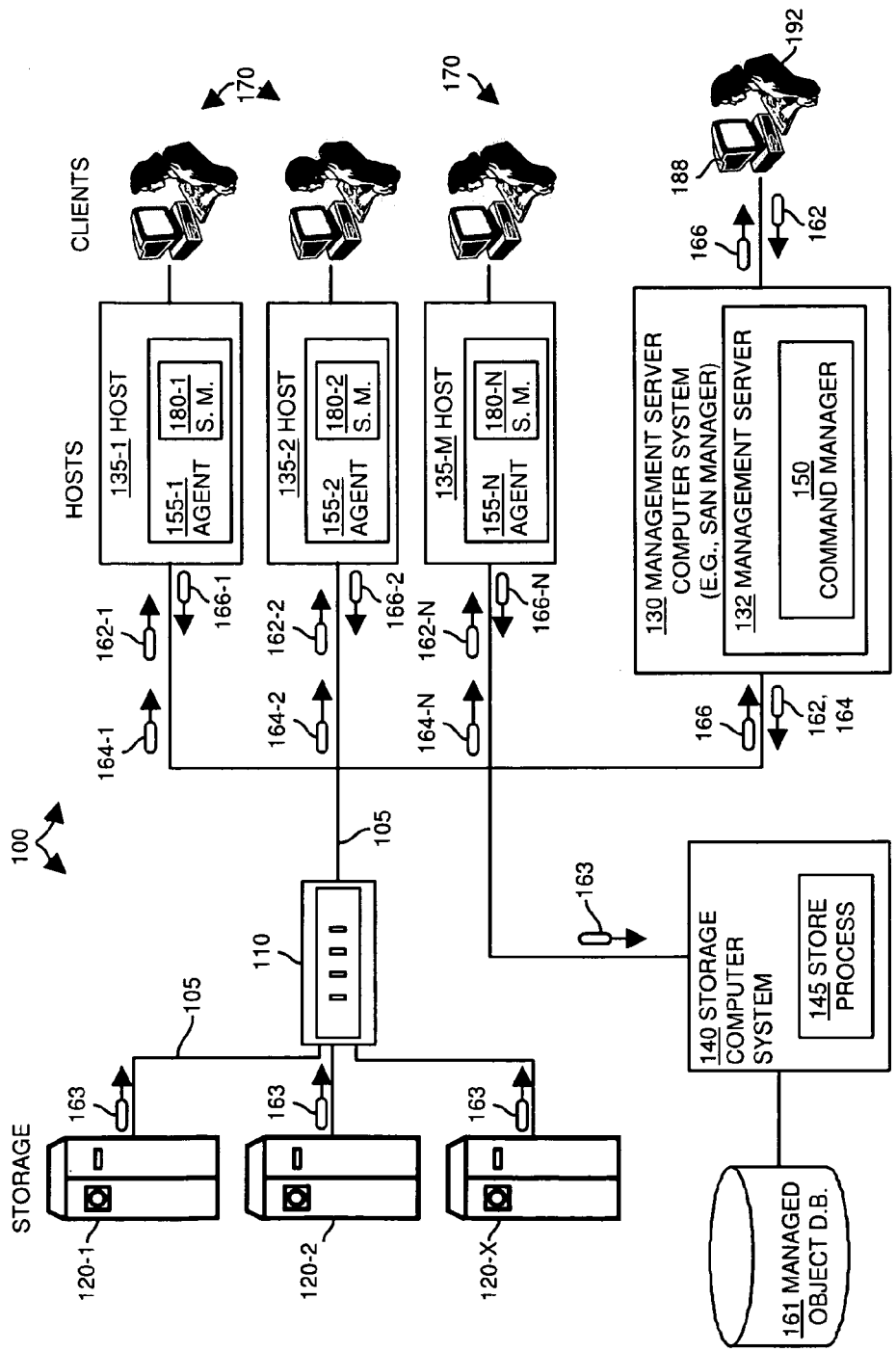
FIG. 1 illustrates an example storage area network and computing system environment including a command manager and status manager configured to operate according to embodiments of the invention.

FIG. 1 illustrates an example of a networking environment suitable for use in explaining example embodiments of the invention. In this example, the networking environment is a storage area network 100 that includes a communications medium 105 that interconnects a plurality of data storage systems 120-1 through 120-X through one or more connectivity devices 110 (e.g., storage area network switches) to a plurality of host computer systems 135-1 through 135-M that serve data to client computer systems 170.

This example storage area network 100 includes a management server computer system 130 that operates a management server 132 (i.e., a software application) that includes a command manager 150 configured in accordance with embodiments of the invention. In addition, the storage area network 100 includes a storage computer system 140 (there may be more than one) that, in this example, operates a store process 145 (there may be more than one). A plurality of agent software processes 155-1 through 155-M that each include a status manager 180 operate within one or more of the host computer systems 135-1 through 135-M. Generally, the agents 155 and store processes 145 interoperate with, and are collectively considered parts of the management application 132. A network administrator 192 interacts via an application 188 (e.g., such as a console application operating on another computer system as shown in this example) with the management application 132 executing on the management server computer system 130 in order to remotely administer manageable resources within the storage area network 100. Manageable resources include, for example, data storage systems 120, the connectivity devices 110 and the host computer systems 135 or many other types of hardware or software entities within the storage area network 100. Note that the console may be a process operating on the management server, a host or the storage computer system or on another computer system.

The network administrator 192 can operate the application 188 to cause the command manager 150 in the management server 132 to send a command 162 to an agent 155 for execution by that agent. Commands 162-1 through 162-N represent commands sent to each agent 155-1 through 155-N. Such a command 162 might cause the agent 155 to collect data 163 form resources such as the data storage systems 120 within the storage area network 100 and transfer this data 163 to the storage process 145 for storage within the managed object database 161. The command manager 150 in the management server 132 and the status manager 180 in each agent 155 are configured to operate as explained herein. In particular, as an agent 155 processes a command 162, the command manager 150 can send periodic status requests 164 to an agent 155 to determine the status of execution of the command(s) 162 sent to that agent 155. In response, the status manager 180 in each agent can respond with a status response 166 that gets sent back to the command manager 150 indicating the status of execution of a command 162 by that agent 155 at the time of the status request 164. The command manager 150 can return this current state of execution of the command 162 as indicated in the status response 166 to the application(s) 188 that has registered to receive this status. In this manner, the system provides mechanisms to obtain up to date status on command execution by agents 155.

Figure 2:
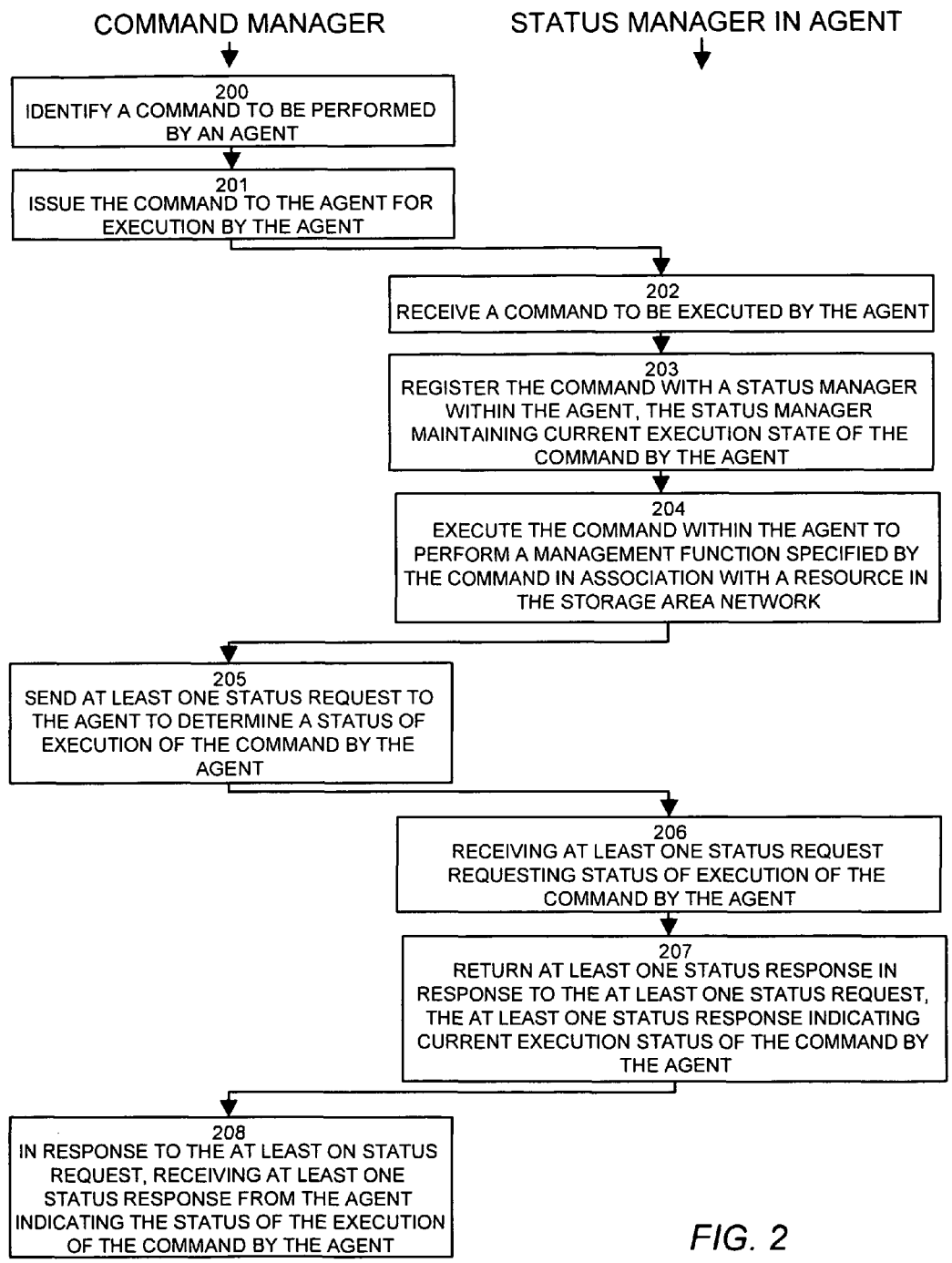
FIG. 2 is a flow chart of processing steps that show the general operation of an agent process configured to process management information according to one example embodiment of the invention.

FIG. 2 shows high level processing operations performed by the command manager 150 in the management server 130 and the status manager 180 in an agent 155 shown in FIG. 1 to allow the command manager 150 to collect execution status 166 concerning operation of commands 162 for return to an application 188 in accordance with embodiments disclosed herein. In the flowchart shown in FIG. 2, processing performed by the command manager 150 is shown as steps on the left-hand side of the flowchart while processing steps on the right-hand side of the flowchart show processing performed by the status manager 180 in an agent 155.

In step 200, the command manager 150 identifies a command 162 to be performed by an agent 155. The command 162 may be a command received from an application 188 such as a console under control of an administrator 192. The command 162 may be a request to perform a management function such as collection of data 163 from a managed resource such as a data storage system 120. As will be explained, command manager 150 assigns a transaction identifier to the command to allow future requests for status 164 and status responses 166 to be associated with a particular command 162 in order to be able to return the appropriate status 166 of the appropriate command 162 to the appropriate application 188.

In step 201, the command manager 150 issues the command 162 to the agent 155 for execution by the agent 155. This step causes the management server 132 to transfer the command 162 to the agent 155 responsible for managing the managed resource (e.g., data storage system 120).

In step 202, the status manager 180 (in the agent 155) receives the command 162 to be executed by the agent 155.

In step 203, the status manager 180 registers the command 162 to allow the status manager 180 to maintain current execution state of the command 162 by the agent 155. Generally, registration of the command 162 allows the status manager 180 to track execution of the command 162 by the agent 155 in various states and allows the status manager 180 to associate different states of execution to different commands 162 that may be active within the agent 155.

In step 204, the status manager 180 executes the command 162 within the agent 155 to perform a management function specified by the command in association with a resource in the storage area network.

In step 205, and some point in time after transmitting the command 162 to the agent 155, the command manager 150 sends at least one status request 164 to the agent 155 to determine a status of execution of the command 162 by that agent 155. As will be explained, the period or frequency of status requests 164 can be set by the application 188 that initiated the command 162.

In step 206 the status manager 180 in the agent 155 receives each status request 164 requesting status of execution of the command 162 by the agent 155.

In step 207, the status manager 180 in the agent 155 returns a status response 166 in response to the status request 164. The status response 166 indicates current execution status of the command 162 as maintained by the status manager 180 in the agent 155.

In step 208, the command manager 150 in the management application 132 receives each status response 166 from the agent 155 indicating the status of the execution of the command 162 by the agent 155. Command manager 150 can return to status information indicating execution state of the command 162 to the application 188 that initiated the command thus allowing administrator 192 to determine a precise current execution state of the command 162 within the agent 155. In this manner, the system of the invention allows the application 188 to specify the periodic interval such as one minute, and on each occurrence of this interval, the system provides the administrator 192 the current status of command execution by agents 155.

Figure 3:
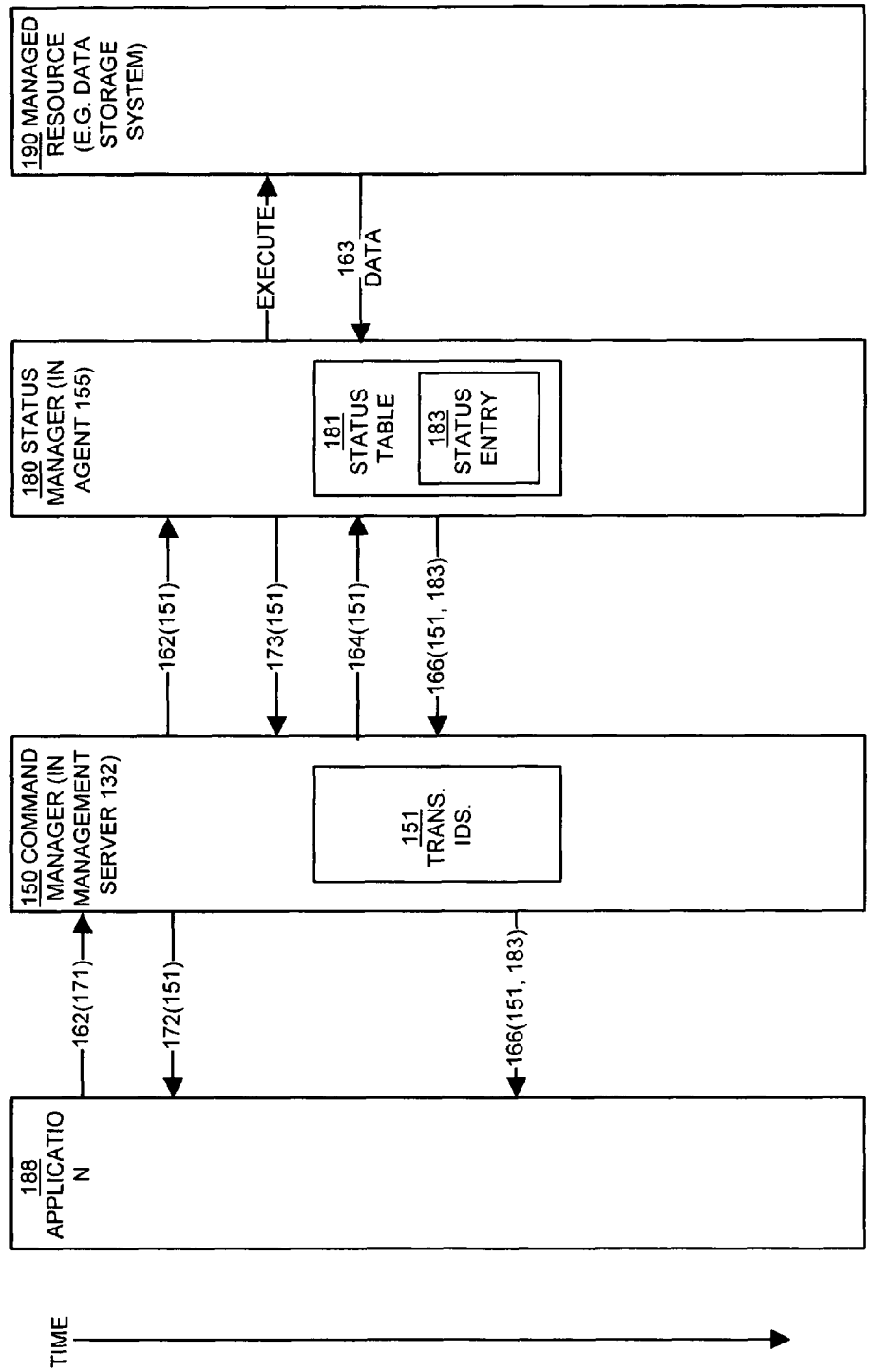
FIG. 3 shows messages exchanged between a command manager and status manager configured to operate according to embodiments of the invention.

FIG. 3 is a protocol diagram indicating the sequence of messaging that takes place between the application 188, the management server 132 operating the command manager 150, and the agent 155 operating the status manager 180 in accordance with one example by the invention. Also shown in FIG. 3 are some internal data structures maintained by the command manager 150 in the status manager 180. In particular, the command manager 150 maintains a set of transaction identifiers 151. Command manager 150 can assign a transaction identifier 151 to each command 162 received from an application 188. As will be explained, as commands are issued to in agent 155, the command 162 transmitted to the agent 155 includes the assigned transaction identifier 151 associate with the command 162. Likewise, status requests 164 also include the transaction identifier 151 associate with the command 162 for which status is being requested. Status response is 166 further include the transaction identifier 151 and allow the command manager 150 to return the appropriate status for the appropriate command to the appropriate application 188.

The status manager 180 operating within each agent 155 maintains a status table 181 used to maintain current execution state of each command 162 received by that agent 155. Example contents of the status table 181 include command name, transaction identifier associated with the command, a timestamp of initial receipt of the command, current execution state of the command, amount of work remaining to be performed by the command (e.g., represented, for example, as a amount of data 163 remaining to be collected from a managed resource in proportion to the total amount of data can be collected from the resource), and possibly other information. By maintaining the status table 181, status manager 180 is able to quickly respond to status requests 164 for the current execution state of the command.

Further details of the system will now be explained with reference to flow charts of processing steps in FIGS. 4 through 7.

Figure 4:
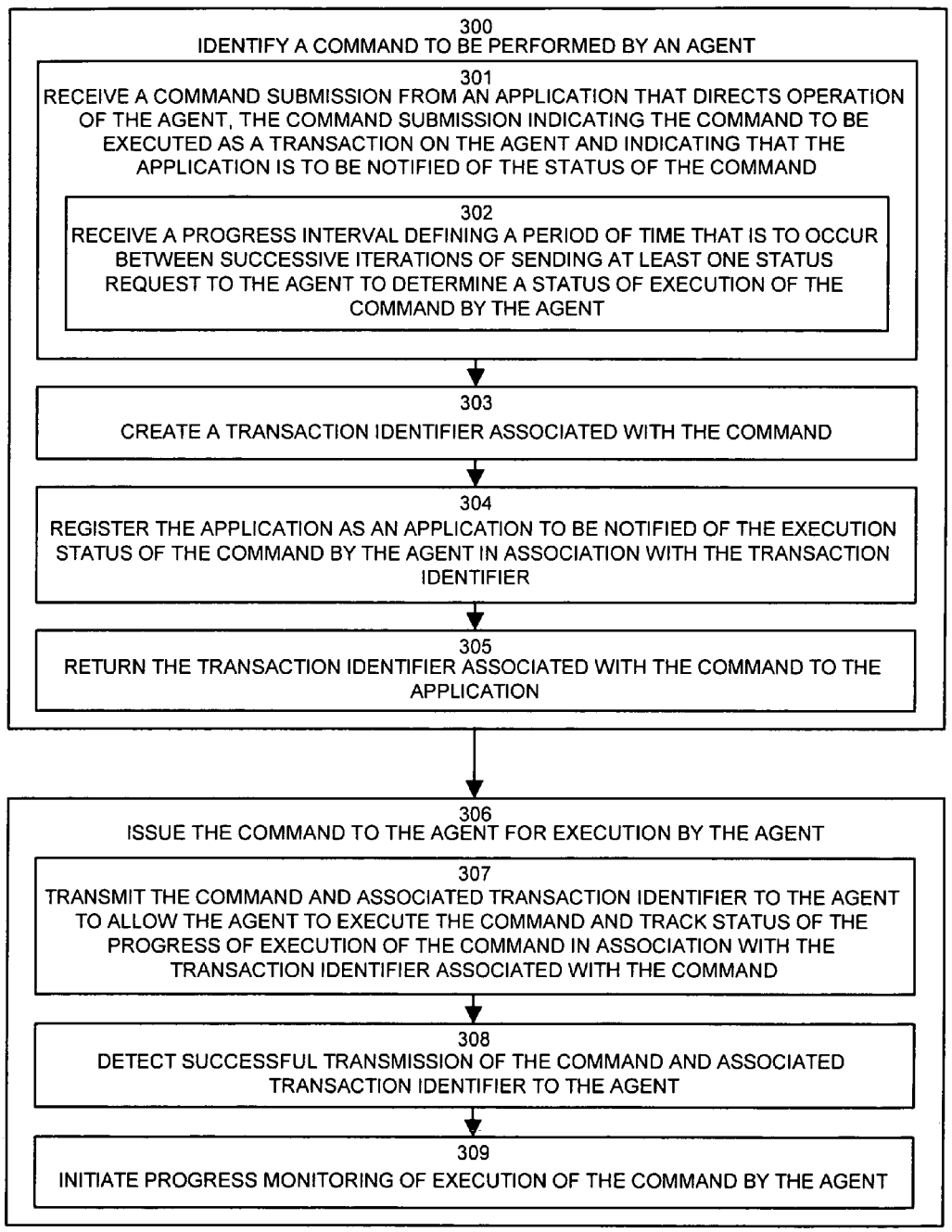
FIG. 4 is a flow chart of processing steps that a command manager performs to receive and initiate a command for execution by an agent according to one example embodiment of the invention.

FIG. 4 is a flowchart of processing steps that the command manager 150 performs within the management server application 132 in order to receive and issue a command 162 to an agent 155 and begin monitoring of progress of execution of the command by that agent.

In step 300, the command manager 150 identifies a command 162 to be performed by an agent 155. This is similar step 200 above, and details of this processing are shown in steps 301 through 305 below.

In step 301, the command manager 150 receives a command submission 162 from an application 188 that directs operation of an agent 155. The command submission 162 indicates (i.e. provides) the command 162 to be executed as a transaction (may be more than one transaction to fulfill a command 162) on the agent 155 and indicates that the application 188 is to be notified of the status of the command 162.

In step 302, command manager 150 also receives a progress interval 171 (that may be received as part of the command 162) defining a period of time that is to occur between successive iterations of sending status requests 164 to the agent 155 of to determine a status of execution of the command by the agent.

In step 303, the command manager 150 creates a transaction identifier 151 associated with the command 162. The command manager 150 maintains the transaction identifier 151 in association with the command 162 in a persistent manner.

In step 304, the command manager 150 registers the application 188 as an application to be notified of the execution status of the command 162 in association with the transaction identifier 151.

In step 305, the command manager 150 returns 172 the transaction identifier 151 associated with the command to the application 188.

In step 306, the command manager 150 issues the command 162 to the agent 155 for execution by the agent. Steps 307 through 309 illustrate processing details of step 306.

In step 307, the command manager 150 transmits the command 162 and associated transaction identifier 151 to the agent 155 to allow the agent 155 to execute the command 162 and track status of the progress of execution of the command in association with the transaction identifier 151 associated with the command 162.

In step 308, the command manager 150 detects 173 successful transmission of the command 162 and associated transaction identifier 151 to the agent 155.

In step 309, in response, the command manager 150 initiates progress monitoring of execution of the command by the agent by tracking expiration of the polling interval 171.

Figure 5:
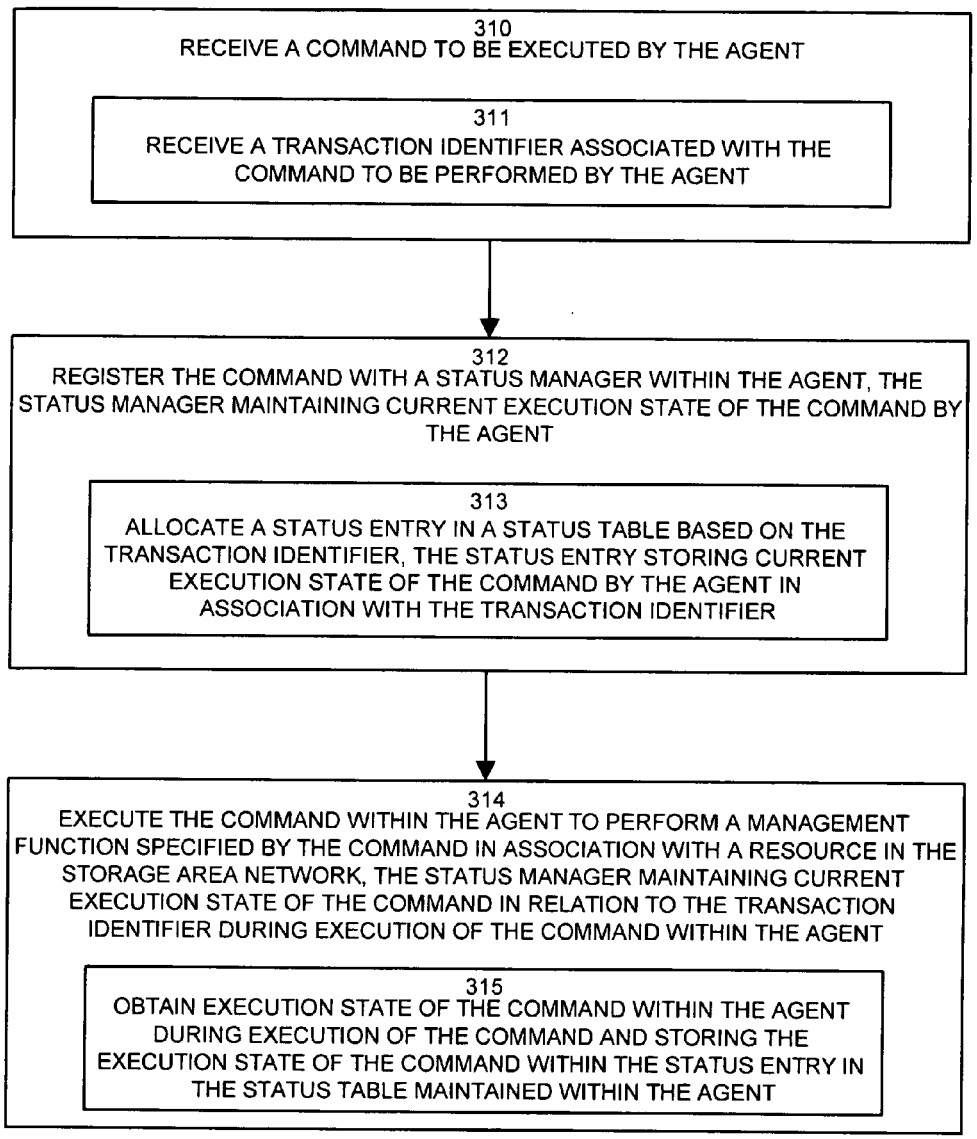
FIG. 5 is a flow chart of processing steps that a status manager performs to receive and initiate a command for execution in an agent according to one example embodiment of the invention.

FIG. 5 is a flowchart of processing steps that the status manager 180 performs within the agent 155 in order to receive and monitor status of a command 162.

In step 310, the status manager 180 receives the command 162 to be executed by the agent.

In step 311, in one configuration as part of receiving the command 162, the status manager 180 receives a transaction identifier 151 associated with the command to be performed by the agent 155.

In step 312, the status manager 180 registers the command within the agent to maintain current execution state (in the status table 181) of the command 162 by the agent.

In step 313, the status manager 180 allocates a status entry 183 in the status table 181 based on the transaction identifier 151. The status entry 183 stores the current execution state of the command by the agent in association with the transaction identifier 151. As noted above, the status entry can include information such as a timestamp of receipt of the command 162 by the agent 155, the transaction identifier 151 for the command 162, the command itself (as issued to the agent 155), the current status of execution of the command, such as pending, halted, in progress, failed, unknown or the like. The status entry can also contain an indication of an amount of work that has been done, or that remains to be done by the command. As an example, a percentage of total data collected may be included.

In step 314, the agent 155 executes the command 162 to perform a management function specified by the command in association with a resource (e.g., data collection from a storage system 120) in the storage area network 100. While the command is present within the agent 155, the status manager 180 maintains current execution state of the command in relation to the transaction identifier 151.

In step 315, the status manager 180 obtains execution state of the command periodically within the agent during execution of the command and stores the execution state of the command within the status entry 183 in the status table 181 maintained within the agent 155.

Figure 6:
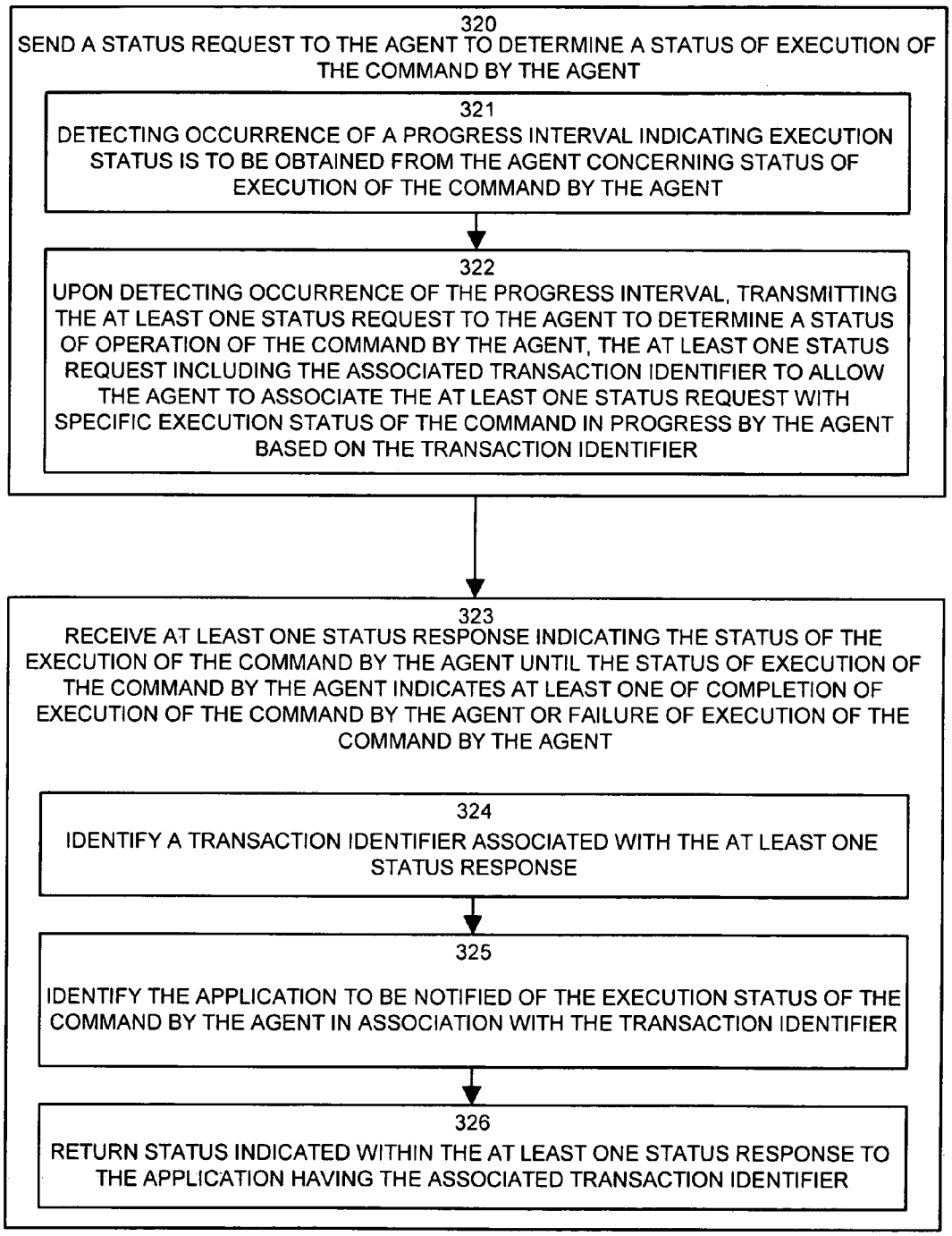
FIG. 6 is a flow chart of processing steps that a command manager performs to send a status request and receive a status response from an agent according to one example embodiment of the invention.

FIG. 6 is a flowchart of processing steps that the command manager 150 performs to obtain status of execution of a command by an agent 155.

In step 320, the command manager 150 sends at least one status request 164 to the agent 155 to determine a status 166 of execution of the command 162 by the agent 155. Steps 321 and 322 show details of this process in one example configuration.

In step 321, the command manager 150 detects occurrence of a progress interval 171 indicating execution status is to be obtained from the agent 155 concerning status of execution of the command 162 by the agent.

In step 322, upon detecting occurrence of the progress interval, the command manager 150 transmits the status request 164 to the agent 155 to determine a status of operation of the command 162 by the agent 155. Each status request 164 includes the associated transaction identifier 151 to allow the agent 155 to associate the status request 164 with specific execution status (e.g. a specific status entry 183 in the status table 181) of the command 162 in progress by the agent 155 based on the transaction identifier.

In step 323, at some time after sending the status request 164, the status manager 150 receives a corresponding status response 166 indicating the status (183) of the execution of the command 162 by the agent 155.

The processing of steps 320 through 323 can repeat at each occurrence of the polling period 171 until the status of execution of the command by the agent indicates either completion of execution of the command by the agent or failure of execution of the command by the agent (or until some number of successive status request attempts each return unknown status).

In step 324, for each status response 166 received, the command manager 150 identifies a transaction identifier 151 associated with the status response 166.

In step 325, the command manager 150 identifies the application 188 to be notified of the execution status (183) of the command 162 by the agent in association with the transaction identifier 151.

In step 326, the command manager 150 returns status 183 (i.e., content from the status entry 183) indicated within the status response 166 to the application(s) 188 having the associated transaction identifier 151 (or to any application 188 that has registered to receive such status).

Figure 7:
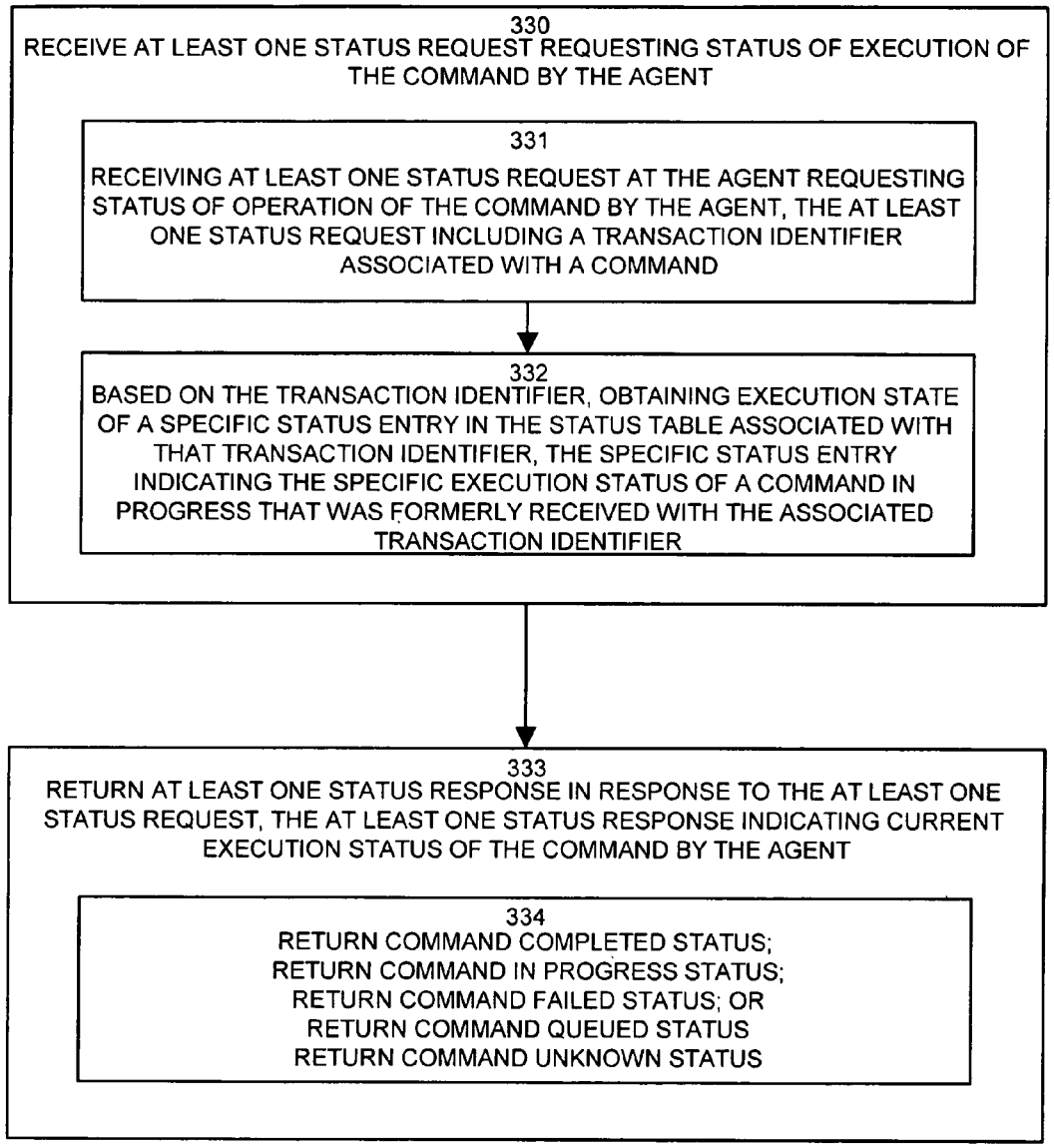
FIG. 7 is a flow chart of processing steps that a status manager performs to process a status request in an agent according to one example embodiment of the invention.

FIG. 7 is a flowchart of processing steps that the status manager 180 performs to respond to a status request 164 and return a status response 166 back to the command manager 150.

In step 330, the status manager 180 receives at least one status request 162 requesting status of execution of the command by the agent.

In step 331, the status manager 180 receives the status request that includes a transaction identifier 151 associated with a command 162.

In step 332, based on the transaction identifier 151, the status manager 180 obtains execution state of a specific status entry 183 in the status table 181 associated with that transaction identifier 151. The specific status entry 183 as noted above indicates the specific execution status of a command 162 in the agent that was formerly received with the associated transaction identifier 151.

In step 333, the status manager 180 returns a status response 166 in response to the status request 164. The status response 166 indicates current execution status 183 of the command 162 by the agent 155.

In step 334, the status manager 180 can return status 183 such as in progress status, failed status, unknown status and the like.

In this manner, the system explained above allows a management application to obtain status as needed concerning execution of commands by agents.

Figure 8:
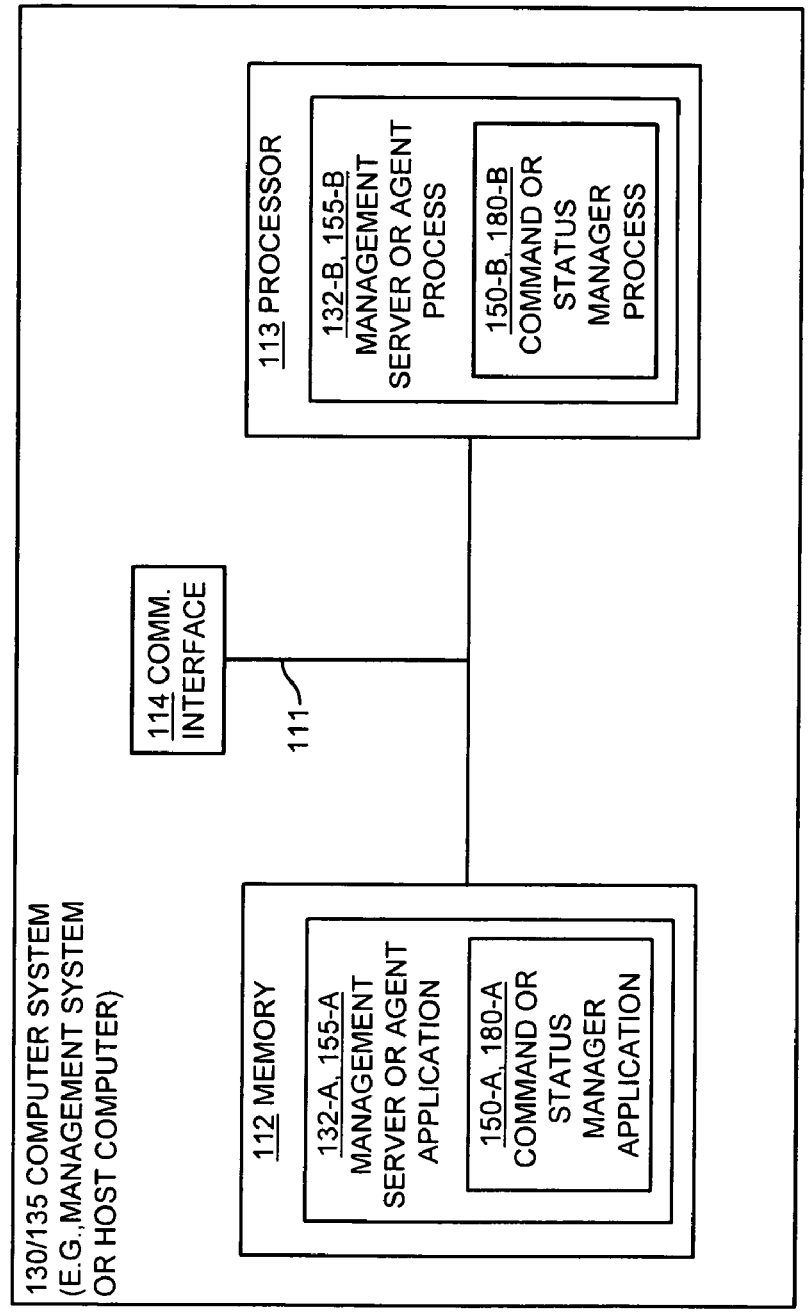
FIG. 8 illustrates example architecture of host or management computer systems and computer readable mediums (computer memory in this example) configured in accordance with example embodiments of the invention.

FIG. 8 illustrates example architectures of a computer system that is configured as either a host computer system 135 operating an agent application and process 155-1 and 155-B (including a status manager application 180-A and process 180-B) or a management computer system 130 operating a management server application 132-A and process 132-B (including a command manager application 150-A and process 150-B). The computer systems 130 and 135 may be any type of computerized device or system such as a personal computer, workstation, portable computing device, mainframe, server or the like. In this example, each includes an interconnection mechanism 111 that couples a memory system 112, a processor 113, and a communications interface 114. The communications interface 114 allows the computer systems 130 and 135 to communicate with each other over the storage area network 100.

The memory system 112 may be any type of computer readable medium that is encoded with an applications 132-A, 155-A, 150-A, 180-A that represent software logic code such as data and/or logic instructions (e.g., stored in the memory or on another computer readable medium such as a disk) that embody the processing functionality of embodiments of the invention for either the agent 155 including the status manager 180 or the management server 132 including the command manager 150 as explained above. The processor 113 can access the memory system 112 via the interconnection mechanism 111 in order to launch, run, execute, interpret or otherwise perform the logic instructions of the applications in order to produce a corresponding processes 132-B, 155-B, 150-B, 180-B. In other words, the command manager 150-B and status manager 180-B processes represent one or more portions of the command manager 150-A and status manager 180-A applications performing within or upon the processor 113 in the computer system. It is to be understood that either one or both of the applications and/or the process represent the command manager 150 and status manager 180 operating as explained in former examples.

It is to be understood that embodiments of the invention include the applications (i.e., the un-executed or non-performing logic instructions and/or data) encoded within a computer readable medium such as a floppy disk, hard disk or in an optical medium, or in a memory system such as in firmware, read only memory (ROM), or, as in this example, as executable code within the memory system 112 (e.g., within random access memory or RAM). It is also to be understood that other embodiments of the invention can provide the applications operating within the processor 113 as the processes. While not shown in this example, those skilled in the art will understand that the computer systems 135 and/or 130 may include other processes and/or software and hardware components, such as an operating system, which have been left out of this illustration for ease of description of the invention.

Other alternative arrangements of the invention include rearranging the processing steps explained above in the flow charts in such a way that the overall effect of the invention is the same. It is to be thus understood by those skilled in the art that the particular arrangement of processing steps in many instances does not specify the exact implementation of embodiments of the invention. As such, those skilled in the art of software development and computer-related technologies will understand that there can be many ways and orders of representing the processing operations explained above and such alternative software code will still achieve the overall operation as explained herein.

In addition, embodiments of the invention are not limited to operation on the computer systems shown above. The command manager 150 and status manager 180 can operate on shared computing resources, or can be distributed among any number of computer systems. Furthermore, embodiments of the invention are not limited to operation in a storage area network management application, but are intended to be generally applicable to any type of network management application. Accordingly, embodiments of the invention are not limited to the processing arrangements explained above.

What is claimed is:

1. A method for determining status of execution of a SAN management command by an agent on a remote host in a storage area network (SAN) at a command manager operating in a SAN management computer system, the method comprising:

receiving at the command manager a SAN management command submission from a SAN application that directs operation of an agent on a remote host to manage resources in the SAN, each command submission indicating the SAN management command to be executed as a transaction on the agent and indicating that the SAN application is to be notified of the status of the SAN management command;

creating at the command manager a transaction identifier associated with the SAN management command;

registering at the command manager at least one of a plurality of the SAN applications as an application to be notified of the execution status of the SAN management command by the agent in association with the transaction identifier;

returning the transaction identifier associated with the SAN management command from the command manager to the SAN application;

issuing the SAN management command to the agent for execution by the agent to perform a management function specified by the command in association with a resource in the SAN;

sending at least one status request from the command manager to the agent to determine a status of execution of the SAN management command by the agent according to a status entry in a status table based on the transaction identifier, the status entry storing current execution state of the command by the agent in association with the transaction identifier;

in response to the at least one status request sent from the command manager to the agent, receiving at least one status response from the agent indicating the status of the execution of the SAN management command by the agent; and returning the status of execution of the SAN management command indicated within the at least one status response received at the command manager from the agent to the SAN application that submitted the command to the command manager and having the associated transaction identifier.

2. The method of claim 1 wherein receiving a command submission from an application comprises:

receiving in the command manager a progress interval, as part of the of the SAN management command, defining a period of time that is to occur between successive iterations of sending at least one status request to the agent to determine a status of execution of the command by the agent.

3. The method of claim 1 wherein issuing the command to the agent comprises:

transmitting the command and associated transaction identifier to the agent to allow the agent to execute the command and track status of the progress of execution of the command in association with the transaction identifier associated with the command.

4. The method of claim 3 wherein issuing the command to the agent comprises:

detecting successful transmission of the command and associated transaction identifier to the agent; and initiating progress monitoring of execution of the command by the agent.

5. The method of claim 4 wherein sending at least one status request to the agent to determine a status of operation of the command by the agent comprises:

detecting the completion of a progress interval indicating execution status is to be obtained from the agent concerning status of execution of the command by the agent; and upon detecting the completion of the progress interval, transmitting the at least one status request to the agent to determine a status of operation of the command by the agent, the at least one status request including the associated transaction identifier to allow the agent to associate the at least one status request with specific execution status of the command in the agent based on the transaction identifier.

6. The method of claim 5 comprising:

repeating the operations of:

i) detecting the completion of the progress interval;

ii) transmitting the at least one status request to the agent to determine a status of operation of the command by the agent; and iii) receiving at least one status response indicating the status of the execution of the command by the agent until the status of execution of the command by the agent indicates at least one of completion of execution of the command by the agent and failure of execution of the command by the agent.

7. The method of claim 1 wherein the command is a long running command to be executed by the agent for more than one minute within the agent and wherein sending at least one status request to the agent to determine a status of execution of the command by the agent occurs multiple times during execution of the command by the agent and wherein receiving at least one status response from the agent indicating the status of the execution of the command by the agent comprises at least one of:

returning command completed status to the application;
returning command in progress status to the application;
returning command failed status to the application; and
returning command unknown status to the application.

8. In an agent operating on a remote host to manage a resource in a storage area network (SAN), a method for providing status of a SAN management command executed by the agent, the method comprising:

receiving a SAN management command to be executed by the agent from a command manager operating in a SAN management computer system configured to register at least one of a plurality of SAN applications as an application to be notified of the execution status of the command by the agent;

registering the SAN management command with a status manager within the agent configured to maintain current execution state of the SAN management command by the agent in relation to a transaction identifier received from the SAN management computer system and associated with the SAN management command during execution of the SAN management command within the agent, registering the SAN management command comprising allocating a status entry in a status table based on the transaction identifier, the status entry storing current execution state of the command by the agent in association with the transaction identifier;

executing the SAN management command within the agent to perform a management function specified by the SAN management command in association with the resource in the SAN;

receiving at least one status request from the command manager requesting status of execution of the SAN management command by the agent; and returning to the command manager from the agent at least one status response in response to the at least one status request received by the agent, the at least one status response indicating current execution status of the SAN management command by the agent.

9. The method of claim 8 wherein receiving a command to be performed by the agent comprises receiving a transaction identifier associated with the command to be performed by the agent.

10. The method of claim 9 wherein maintaining current execution state of the command in relation to the transaction identifier during execution of the command within the agent comprises:

obtaining execution state of the command within the agent during execution of the command and storing the execution state of the command within the status entry in the status table maintained within the agent.

11. The method of claim 10 wherein receiving at least one status request requesting status of execution of the command by the agent comprises:
   receiving at least one status request at the agent requesting status of operation of the command by the agent, the at least one status request including a transaction identifier associated with a command;
   based on the transaction identifier, obtaining execution state of a specific status entry in the status table associated with that transaction identifier, the specific status entry indicating the specific execution status of a command in the agent that was formerly received with the associated transaction identifier.

12. The method of claim 11 wherein the command is a long running command to be executed by the agent and wherein receiving at least one status request at the agent requesting status of operation of the command by the agent occurs multiple times during execution of the command by the agent and wherein returning at least one status response in response to the at least one status request comprises at least one of:
   returning command completed status;
   returning command in progress status;
   returning command failed status; and
   returning command unknown status.

13. A system for determining status of execution of a SAN management command in a storage area network (SAN), the system comprising:
   a management server computer system comprising:
      a first processor; and
      a first non-transitory computer-readable medium including computer program logic encoded thereon that, when executed by the first processor, provides a command manager configured to determine status of agent execution of the SAN management command in the SAN by performing operations of:
         receiving the SAN management command submission from a SAN application that directs operation of an agent on a remote host to manage resources in the SAN, each command submission indicating the SAN management command to be executed as a transaction on the agent and indicating that the SAN application is to be notified of the status of the SAN management command;
         creating a transaction identifier associated with the SAN management command;
         registering at least one of a plurality of the SAN applications as an application to be notified of the execution status of the SAN management command by the agent in association with the transaction identifier;
         returning the transaction identifier associated with the SAN management command to the SAN application;
         issuing the SAN management command to the agent for execution by the agent to perform a management function specified by the command in association with a resource in the SAN;
         sending at least one status request to the agent to determine a status of execution of the SAN management command by the agent according to a status entry in a status table based on the transaction identifier, the status entry storing current execution state of the command by the agent in association with the transaction identifier;
         in response to the at least one status request, receiving at least one status response from the agent indicating the status of the execution of the SAN management command by the agent; and
         returning status indicated within the at least one status response received at the command manager from the agent to the SAN application having the associated transaction identifier; and
   a host computer system comprising:
      a second processor; and
      a second non-transitory computer-readable medium including computer program logic encoded thereon that, when executed by the second processor, provides a status manager operating in the agent configured to provide status of the SAN management command executed by the agent by performing operations of:
         receiving the SAN management command to be executed by the agent from the command manager operating in the SAN management computer system;
         registering the SAN management command with a status manager within the agent configured to maintain current execution state of the SAN management command by the agent in relation to the transaction identifier associated with the SAN management command during execution of the SAN management command within the agent, registering the SAN management command comprising allocating a status entry in a status table based on the transaction identifier, the status entry storing current execution state of the command by the agent in association with the transaction identifier;
         executing the SAN management command within the agent to perform a management function specified by the SAN management command in association with the resource in the SAN;
         receiving at least one status request from the command manager requesting status of execution of the command by the agent; and
         returning to the command manager at least one status response to the at least one of a plurality of registered SAN applications in response to the at least one status request, the at least one status response indicating current execution status of the SAN management command by the agent.

14. A management server computer system comprising:
   a non-transitory computer-readable medium;
   a processor;
   a communications interface; and
   an interconnection mechanism coupling the non-transitory computer-readable medium, the processor and the communications interface;
   wherein the non-transitory computer-readable medium includes computer program logic encoded thereon that, when executed by the processor, provides a command manager that operates in a command manager process that causes the management server computer system to perform the operations of:
      receiving at the command manager a SAN management command submission from a SAN application that directs operation of an agent on a remote host to manage resources in the SAN, each command submission indicating the SAN management command to be executed as a transaction on the agent and indicating that the SAN application is to be notified of the status of the SAN management command;

creating at the command manager a transaction identifier associated with the SAN management command;

registering, at the command manager at least one of a plurality of SAN applications as an application to be notified of the execution status of the SAN management command by the agent in association with the transaction identifier;

returning the transaction identifier associated with the SAN management command from the command manager to the SAN application;

issuing the SAN management command to the agent for execution by the agent over the communications interface to perform a management function specified by the command in association with a resource in the SAN;

sending at least one status request from the command manager over the communications interface to the agent to determine a status of execution of the SAN management command by the agent according to a status entry in a status table based on the transaction identifier, the status entry storing current execution state of the command by the agent in association with the transaction identifier;

in response to the at least one status request sent from the command manager to the agent, receiving at least one status response over the communications interface from the agent indicating the status of the execution of the SAN management command by the agent; and returning the status of execution of the SAN management command indicated within the at least one status response received at the command manager from the agent to the SAN application that submitted the command to the command manager and having the associated transaction identifier.

15. A host computer system comprising:

a non-transitory computer-readable medium;

a processor;

a communications interface; and an interconnection mechanism coupling the a non-transitory computer-readable medium, the processor and the communications interface;

wherein the non-transitory computer-readable medium includes computer program logic encoded thereon that, when executed by the processor, provides a status manager that operates in an agent process that causes the host computer system to perform the operations of:

receiving a storage area network (SAN) management command to be executed by the agent from a command manager operating in a SAN management computer system configured to register at least one of a plurality of SAN applications as an application to be notified of the execution status of the SAN management command by the agent;

registering the SAN management command with the status manager within the agent configured to maintain current execution state of the SAN management command by the agent in relation to a transaction identifier received from the SAN management computer system and associated with the SAN management command during execution of the SAN management command within the agent, registering the SAN management command comprising allocating a status entry in a status table based on the transaction identifier, the status entry storing current execution state of the command by the agent in association with the transaction identifier;

executing the SAN management command within the agent to perform a management function specified by the SAN management command in association with the resource in the SAN;

receiving at least one status request over the communications interface from the command manager requesting status of execution of the SAN management command by the agent; and returning, over the communications interface to the command manager from the agent, at least one status response in response to the at least one status request received by the agent, the at least one status response indicating current execution status of the SAN management command by the agent.

16. A computer program product having a non-transitory computer-readable medium including computer program logic encoded thereon that, when executed on a computer system provides a command manager that causes the computer system to perform the operations of:

receiving at the command manager a SAN management command submission from a SAN application that directs operation of an agent on a remote host to manage resources in the SAN, each command submission indicating the SAN management command to be executed as a transaction on the agent and indicating that the SAN application is to be notified of the status of the SAN management command;

creating at the command manager a transaction identifier associated with the SAN management command;

registering, at the command manager at least one of a plurality of SAN applications as an application to be notified of the execution status of the SAN management command by the agent in association with the transaction identifier;

returning the transaction identifier associated with the SAN management command from the command manager to the SAN application;

issuing the SAN management command to the agent for execution by the agent over the communications interface to perform a management function specified by the command in association with a resource in the SAN;

sending at least one status request from the command manager to the agent to determine a status of execution of the SAN management command by the agent according to a status entry in a status table based on the transaction identifier, the status entry storing current execution state of the command by the agent in association with the transaction identifier;

in response to the at least one status request sent from the command manager to the agent, receiving at least one status response from the agent indicating the status of the execution of the SAN management command by the agent; and returning the status of execution of the SAN management command indicated within the at least one status response received at the command manager from the agent to the application that submitted the command to the command manager.

17. A computer program product having a non-transitory computer-readable medium including computer program logic encoded thereon that, when executed on a computer system provides a status manager that operates in an agent that causes the computer system to perform the operations of:

receiving a storage area network (SAN) management command from to be executed by the agent from a command manager operating in a SAN management computer system configured to register at least one of a plurality of plurality of SAN applications as an application to be notified of the execution status of the SAN management command by the agent;

registering the SAN management command with the status manager within the agent configured to maintain current execution state of the SAN management command by the agent in relation to a transaction identifier received from the SAN management computer system and associated with the SAN management command during execution of the SAN management command within the agent, registering the SAN management command comprising allocating a status entry in a status table based on the transaction identifier, the status entry storing current execution state of the command by the agent in association with the transaction identifier;

executing the SAN management command within the agent to perform a management function specified by the SAN management command in association with the resource in the SAN;

receiving at least one status request from the command manager requesting status of execution of the SAN management command by the agent; and returning to the command manager from the agent, at least one status response in response to the at least one status request received by the agent, the at least one status response indicating current execution status of the SAN management command by the agent.

18. The method of claim 1 wherein the execution status comprises an indication of at least one of:
command unknown; and
command queued.

19. The system of claim 13, wherein returning at least one status response in response to the at least one status request includes returning the status response to a plurality of SAN applications before at least one of completion of execution of the command by the agent and failure of execution of the command by the agent.

20. The method of claim 5, wherein detecting the completion of a progress interval includes defining a period of time that is to occur between successive iterations of sending at least one status request to the agent to determine the status of execution of the command by the agent.

21. The method of claim 1 further comprising registering, within the command manager, a plurality of SAN applications as applications to be notified of execution status.

22. The method of claim 1, wherein the command manager assigns and maintains the transaction identifier corresponding to the command to be executed as a transaction.

23. The method of claim 7, wherein the long running SAN management command to be executed by the agent is one of:
a performance monitoring command;
a network analysis command; and
a remote configuration and administration command.

* * * * *